(12) United States Patent
Wu et al.

(10) Patent No.: US 6,553,451 B2
(45) Date of Patent: Apr. 22, 2003

(54) MEMORY COMMAND CONVERTER AND APPLICATION SYSTEM

(75) Inventors: Kun-Ho Wu, Feng-Shan (TW); Hai-Feng Chuang, Tainan (TW)

(73) Assignee: Leadtek Research Inc., Taipei Hsien (TW)

( * ) Notice: Subject to any disclaimer, the term of this patent is extended or adjusted under 35 U.S.C. 154(b) by 23 days.

(21) Appl. No.: 10/005,558

(22) Filed: Nov. 8, 2001

(65) Prior Publication Data

US 2003/0061438 A1 Mar. 27, 2003

(51) Int. Cl.$^7$ ................................................. G06F 13/00
(52) U.S. Cl. ........................................ 711/105; 711/101
(58) Field of Search .................................. 711/101, 105

(56) References Cited

U.S. PATENT DOCUMENTS

| 6,047,361 A | * | 4/2000 | Ingenio et al. ............... 711/167 |
| 6,411,563 B1 | * | 6/2002 | Tsuji et al. ................... 365/233 |
| 6,449,679 B2 | * | 9/2002 | Ryan ........................... 710/315 |

* cited by examiner

*Primary Examiner*—Reba I. Elmore
(74) *Attorney, Agent, or Firm*—J. C. Patents (57) ABSTRACT

A memory command converter and its application system. The memory command converter serves as a command translator between an extended data output dynamic random access memory (EDO DRAM) and a synchronous dynamic random access memory (SDRAM) so that an application system for using EDO DRAM may also use mainstream SDRAM through the converter.

11 Claims, 7 Drawing Sheets

MEMORY COMMAND CONVERTER AND APPLICATION SYSTEM

BACKGROUND OF THE INVENTION

1. Field of Invention

The present invention relates to a memory controller. More particularly, the present invention relates to a converter and an application program for converting an extended data output dynamic random access memory (EDO DRAM) command into a synchronous dynamic random access memory (SDRAM) command.

2. Description of Related Art

Due to the rapid progression of manufacturing technologies, new types of memory are produced while older types of memory rapidly become obsolete. Hence, the versions of many controller application systems that use older types of memory must either be revised or else production stopped altogether. Although extended data output dynamic random access memory (EDO DRAM) is still manufactured, decrease in production quantity has lead to a price hike that may eventually lead to an end to its production. Ultimately, the price of the application system using this type of memory is increased and the life cycle of such a system is uncertain.

SUMMARY OF THE INVENTION

Accordingly, one object of the present invention is to provide a memory command converter and its application system so that an application system for using extended data output dynamic random access memory (EDO DRAM) may also use a mainstream memory system such as a synchronous dynamic random access memory (SDRAM) through a memory command converter. Thus, cost of the application system is reduced while the working life of the application system is extended.

To achieve these and other advantages and in accordance with the purpose of the invention, as embodied and broadly described herein, the invention provides a memory command converter. The memory converter is capable of converting a first command control signal from a control chip for controlling EDO DRAM into a second command control signal acceptable by a SDRAM chip. The memory converter includes a mode control selection storage device, a command control circuit and a clocking control circuit. The mode control selection storage device is coupled to the control chip for receiving and holding the mode control selection value from the SDRAM chip. The command control circuit is coupled to the mode control selection storage device, the control chip and the SDRAM chip. The command control circuit sets the operating mode of the SDRAM chip and converts the first command control signal from the EDO DRAM into the second command control signal acceptable to the SDRAM chip according to the mode control selection value in the mode control selection storage device. The clocking control circuit is coupled to an external clocking device, the command control circuit, the control chip and the SDRAM chip. The clocking control circuit receives clocking signals from the clocking device and redirects to the command control circuit, the control chip and the SDRAM chip to serve as a synchronizing pulse.

In the preferred embodiment of this invention, one end of the memory command converter includes I first row addresses and J first column addresses that communicate with the control chip through the first command control signal. The other end of the memory command converter includes K second row addresses, L second column addresses and M bank addresses that communicate with the SDRAM chip through the second command control signal. There are three modes altogether. If L>J and N=K+M−I such that N is a whole number greater than zero, the I first row addresses are sent directly from the command control circuit to the I second row addresses and the bank addresses as soon as the I first row addresses are received. Furthermore, according to the setting provided by the mode control selection storage device, the levels of another N second row addresses and bank addresses are determined so that the page among the $2^N$ simulated pages of the SDRAM chip can be selected. As soon as the J first column addresses are received, the addresses are directly transferred to the J second column addresses and the L−J second column addresses are fixed to a low level.

In a second conversion mode according to this invention, if N=(K+L+M)−(I−J) and N is a whole number greater than zero, the I first row addresses are latched and held as soon as the command control circuit receives the I first row addresses. On receiving the J first column addresses, the command control circuit redistributes the I first row addresses and the J first column addresses and re-transmits the addresses to the (I+J−L) second row addresses and bank addresses. According to the setting provided by the mode control selection storage device, the N second row addresses and bank addresses is determined so that the page among the $2^N$ simulated pages of the SDRAM chip can be selected. Finally, the distributed L second column addresses are transmitted.

In a third conversion mode according to this invention, if L+M=J, K−I=N and N is a whole number greater than zero, the I first row addresses are directly transmitted to the I second row addresses continuously $2^M$ times, as soon as the command control circuit receives the I first row addresses. According to the mode control selection value, the levels of the N second row addresses are determined so that the page among the $2^N$ simulated pages of the SDRAM chip can be selected. In the meantime, the $0$–$2^M$−1 bank address values are sequentially transmitted so that various banks in the SDRAM chip are triggered. On receiving the J first column addresses, the J first column addresses are transmitted to the L second column addresses and the M bank addresses.

In addition, the memory command converter according to this invention may be applied to various application systems as long as the application system includes a control chip capable of controlling an EDO DRAM chip and a clocking generator. With the addition of the memory command converter, an EDO DRAM chip may be used alternately with a main stream SDRAM chip. Hence, the manufacturing cost of the application system is reduced and the working life of the application system is extended.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
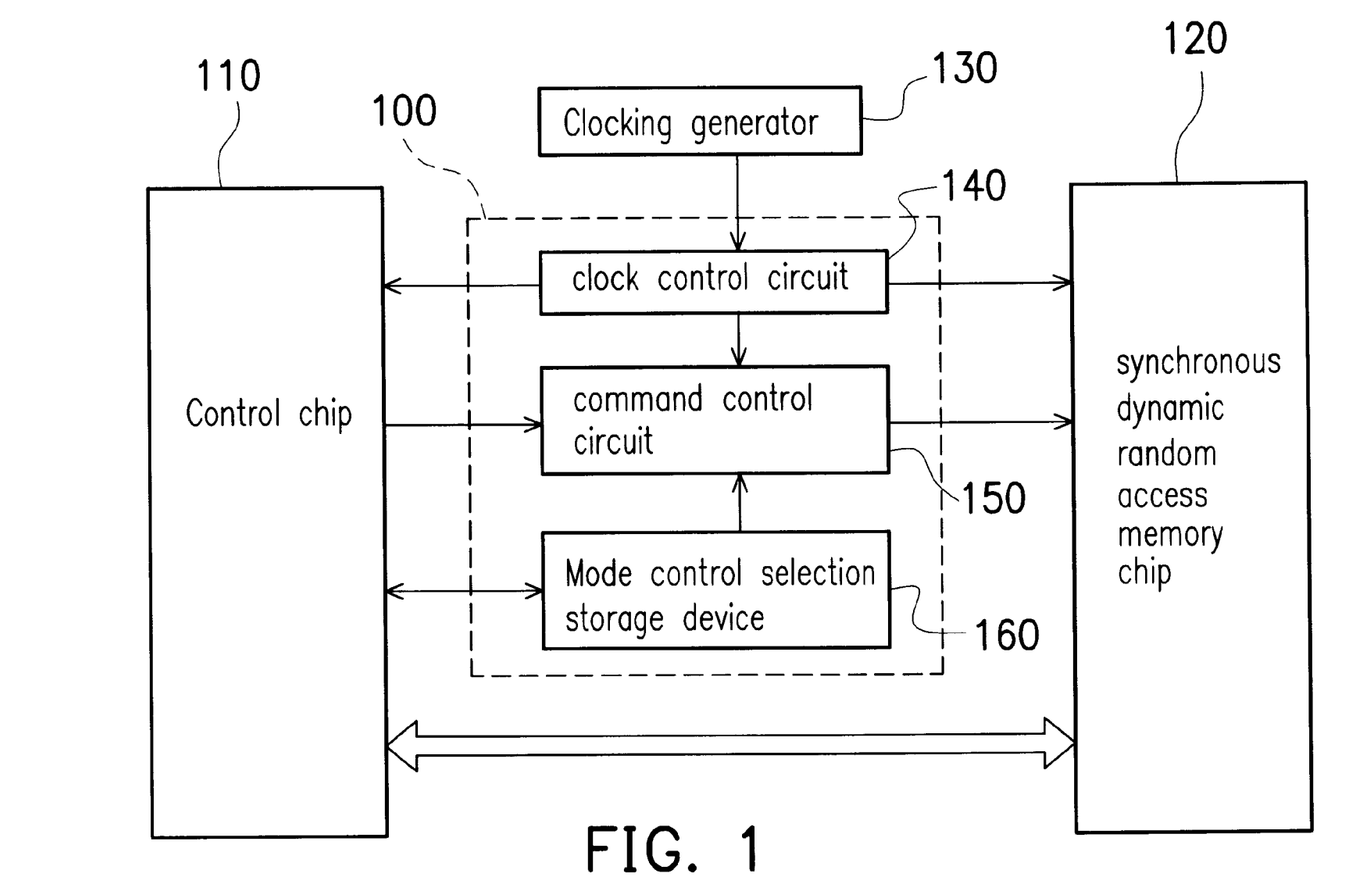
FIG. 1 is a diagram showing a memory command converter and its application system according to one preferred embodiment of this invention.

FIG. 1 is a diagram showing a memory command converter and its application system according to one preferred embodiment of this invention. As shown in FIG. 1, the memory command converter 100 is a device that converts a first command control signal from a control chip 110 serving to control an extended data output dynamic random access memory (EDO DRAM) into a second command control signal acceptable to a synchronous dynamic random access (SDRAM) chip. The memory command converter 100 includes a mode control selection storage device 160, a command control circuit 150 and a clocking control circuit 140. The mode control selection storage device 160 is coupled to the control chip 110 for receiving and holding the mode control selection value from the SDRAM chip 120. The command control circuit 150 is coupled to the mode control selection storage device 160, the control chip 110 and the SDRAM chip 120. The command control circuit 150 sets the operating mode of the SDRAM chip 120 and converts the first command control signal from the EDO DRAM into the second command control signal acceptable to the SDRAM chip 120 according to the mode control selection value in the mode control selection storage device 160. The clocking control circuit 140 is coupled to an external clocking device 130, the command control circuit 150, the control chip 110 and the SDRAM chip 120. The clocking control circuit 140 receives clocking signals from the clocking device 130 and redirects to the command control circuit 150, the control chip 110 and the SDRAM chip 120 to serve as a synchronizing pulse.

Figure 2A:
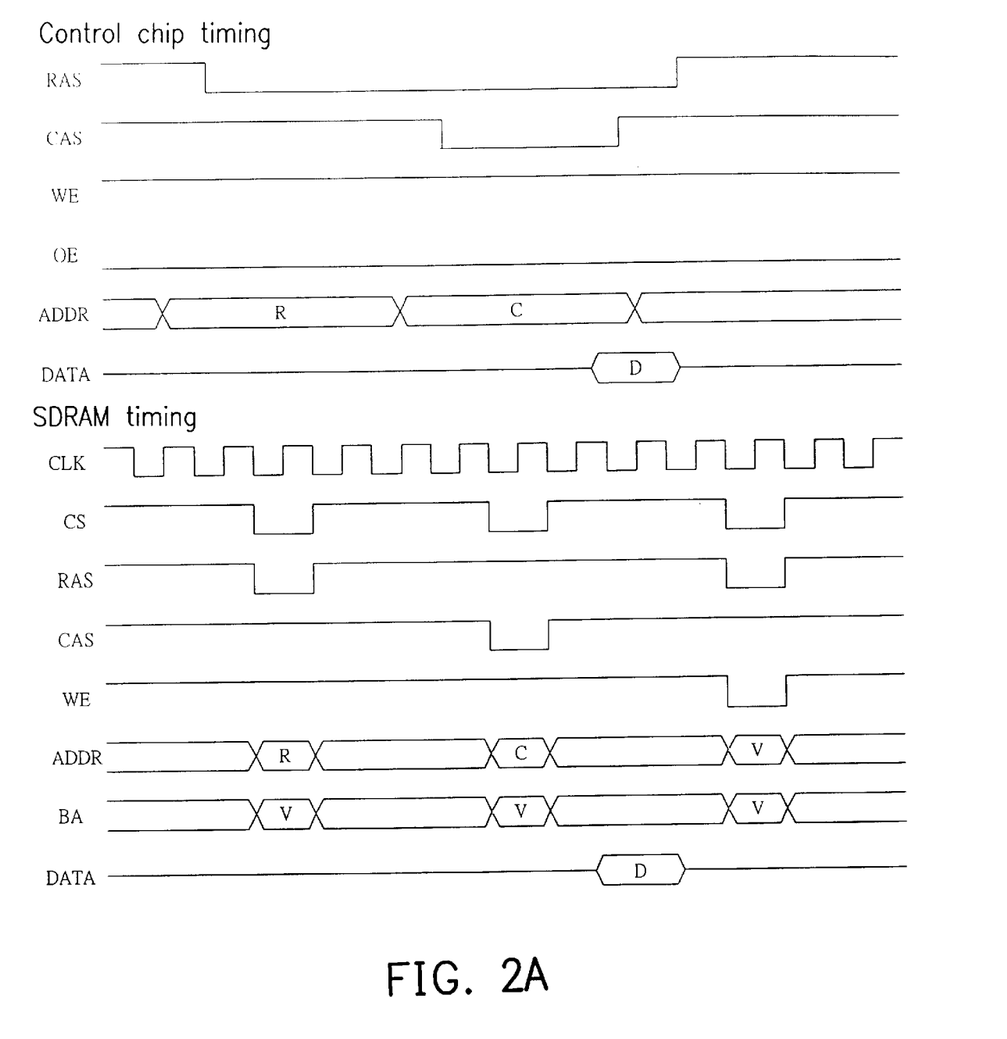
FIG. 2A is a timing diagram showing a reading operation using a conversion mode according to a first preferred embodiment of this invention.
Figure 2B:
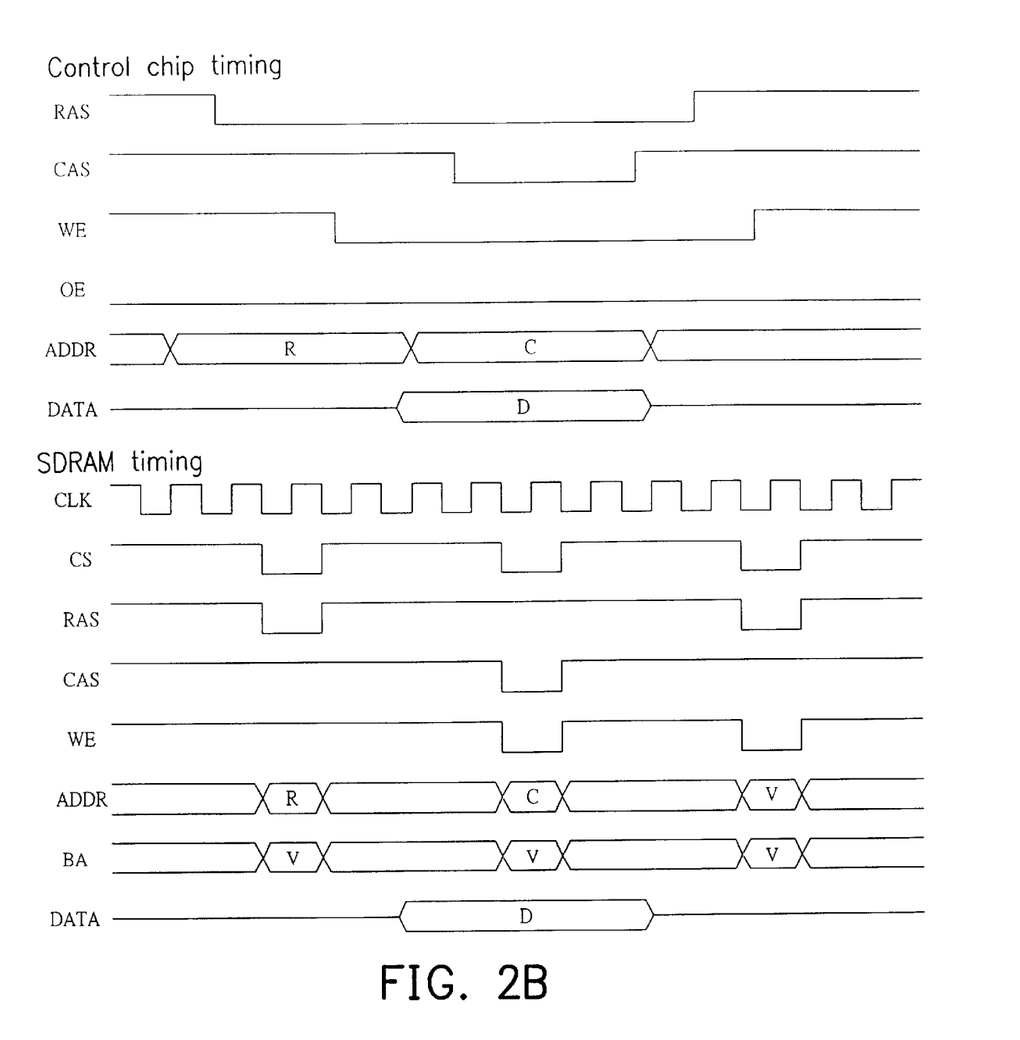
FIG. 2B is a timing diagram showing a write operation using a conversion mode according to a first preferred embodiment of this invention.

FIG. 2A is a timing diagram showing a reading operation using a conversion mode according to a first preferred embodiment of this invention. FIG. 2B is a timing diagram showing a write operation using a conversion mode according to a first preferred embodiment of this invention. In the first embodiment, the EDO DRAM has row addresses R0~R8 and column addresses C0~C7. The SDRAM has row addresses R0~R11, column addresses C0~C7 and bank addresses B0~B1. The row address number L of the SDRAM chip 120 is greater than the column address number J of the EDO DRAM and the sum of the row address number K and the bank address number M exceed the row address number I of the EDO DRAM by five. Hence, the first type of command conversion mode can be used to convert the first command control signal to the second command control signal. Furthermore, the SDRAM chip 120 is simulated as $2^5=32$ pages and the mode control selection value inside the mode control selection storage device is set so that the particular page within the SDRAM chip 120 to be operated upon is selected. As shown in FIGS. 2A and 2B, when the memory command converter 100 receives the row address R0~R8 signals from the control chip 110, the address signals are directly transferred to the row addresses R0~R8 of the SDRAM. Actual levels of the row addresses R9~R11 and the bank addresses B0~B1 are determined by the mode control selection value so that the particular page within the SDRAM chip 120 to be operated upon is determined. On receiving the column address C0~C7 signals from the control chip 110, the memory command converter 100 transfers the column addresses C0~C7 directly to the SDRAM chip 120. After the completion of a read or a write cycle, another clocking signal is used to pre-charge the SDRAM. This type of conversion operating mode enables the memory to operate at a constant efficiency.

Figure 3A:
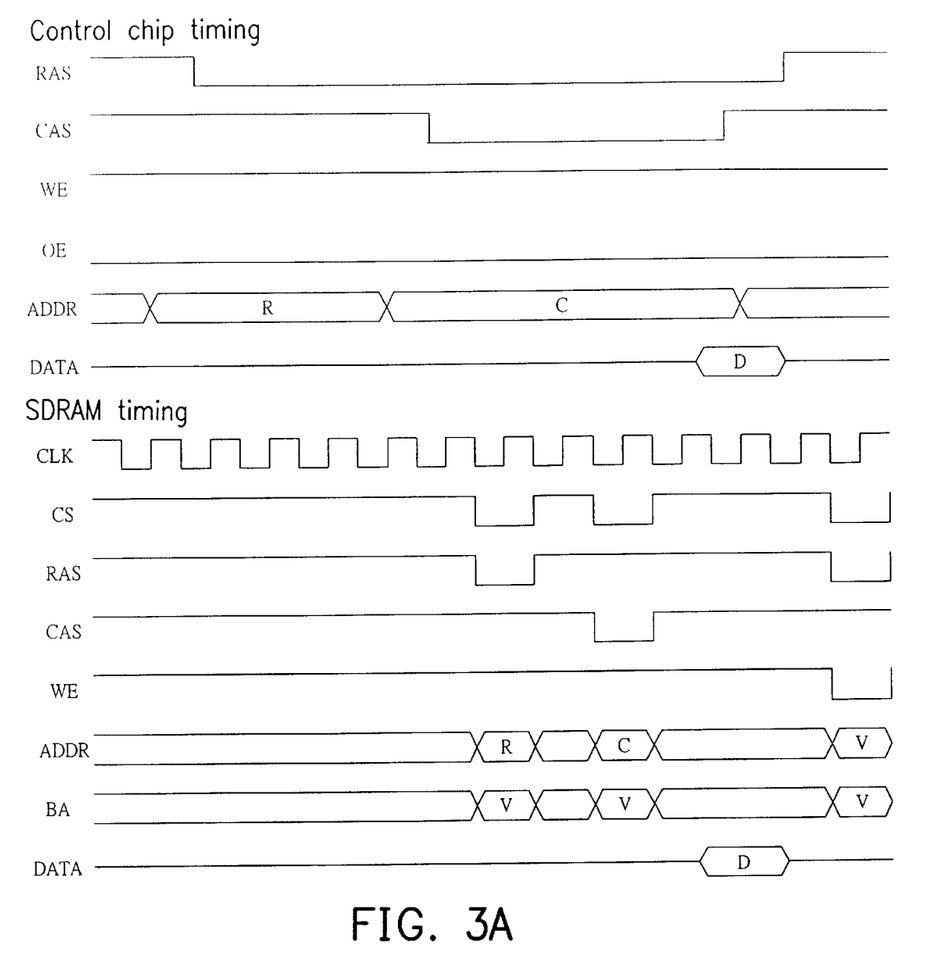
FIG. 3A is a timing diagram showing a reading operation using a conversion mode according to a second preferred embodiment of this invention.
Figure 3B:
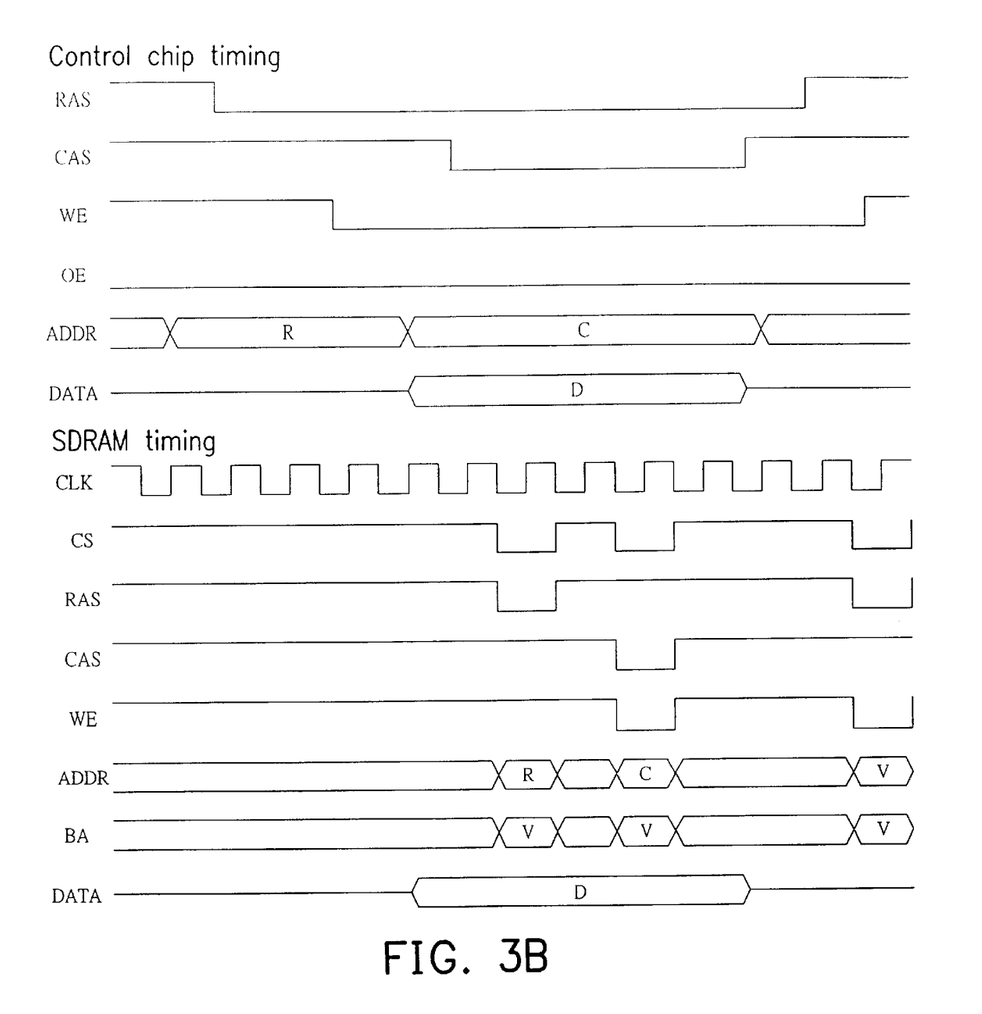
FIG. 3B is a timing diagram showing a write operation using a conversion mode according to a second preferred embodiment of this invention.

FIG. 3A is a timing diagram showing a reading operation using a conversion mode according to a second preferred embodiment of this invention. FIG. 3B is a timing diagram showing a write operation using a conversion mode according to a second preferred embodiment of this invention. In the second embodiment, the EDO DRAM has row addresses R0~R8 and column addresses C0~C7. The SDRAM has row addresses R0~R11, column addresses C0~C8 and bank addresses B0~B1. The column address number L of the SDRAM chip 120 is greater than the column address number J of the EDO DRAM. The sum of the row address number K, the column address number L and the bank address number M of the SDRAM chip 120 exceeds the sum of the row address number I and the column address number J of the EDO DRAM by six. Hence, to utilize the SDRAM chip 120 fully, the second type of command conversion mode can be used to convert the first command control signal to the second command control signal. Furthermore, the SDRAM chip 120 is simulated as $2^6=64$ pages and the mode control selection value inside the mode control selection storage device is set so that the particular page within the SDRAM chip 120 to be operated upon is selected. As shown in FIGS. 3A and 3B, when the memory command converter 100 receives the row address R0~R8 signal from the control chip 110, the row address signals are first latched and retained. On receiving the column addresses C0~C7, the memory command converter 100 distributes the value of any one of the lines in the row addresses R0~R8 (here, R8 is assumed) to the column address C8 of the SDRAM chip 120. The remaining row addresses R0~R7 are transferred to the row addresses R0~R7 of the SDRAM chip 120. Actual levels of the row addresses R8~R11 and the bank addresses B0~B1 are determined by the mode control selection value so that the particular page within the SDRAM chip 120 to be operated upon is determined. Thereafter, the column addresses C0~C8 of the SDRAM chip 120 is transmitted. After the completion of a read or a write cycle, another clocking signal is used to pre-charge the SDRAM chip 120. Since this type of conversion operating mode demands the interception of the row addresses and the column addresses from the control chip 110 before initializing the rearrangement of the dispatching addresses, a little operating efficiency of the memory is sacrificed in return for more flexible memory functions.

Figure 4A:
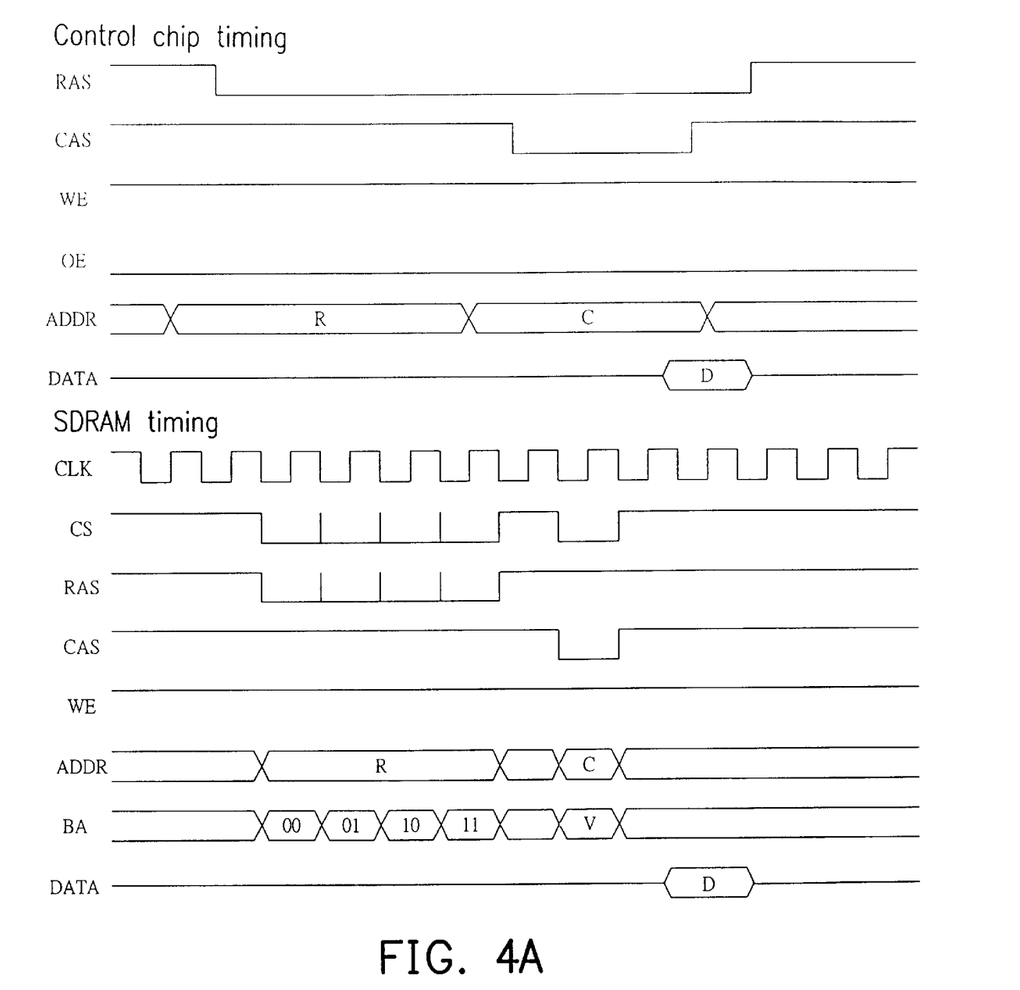
FIG. 4A is a timing diagram showing a reading operation using a conversion mode according to a third preferred embodiment of this invention.
Figure 4B:
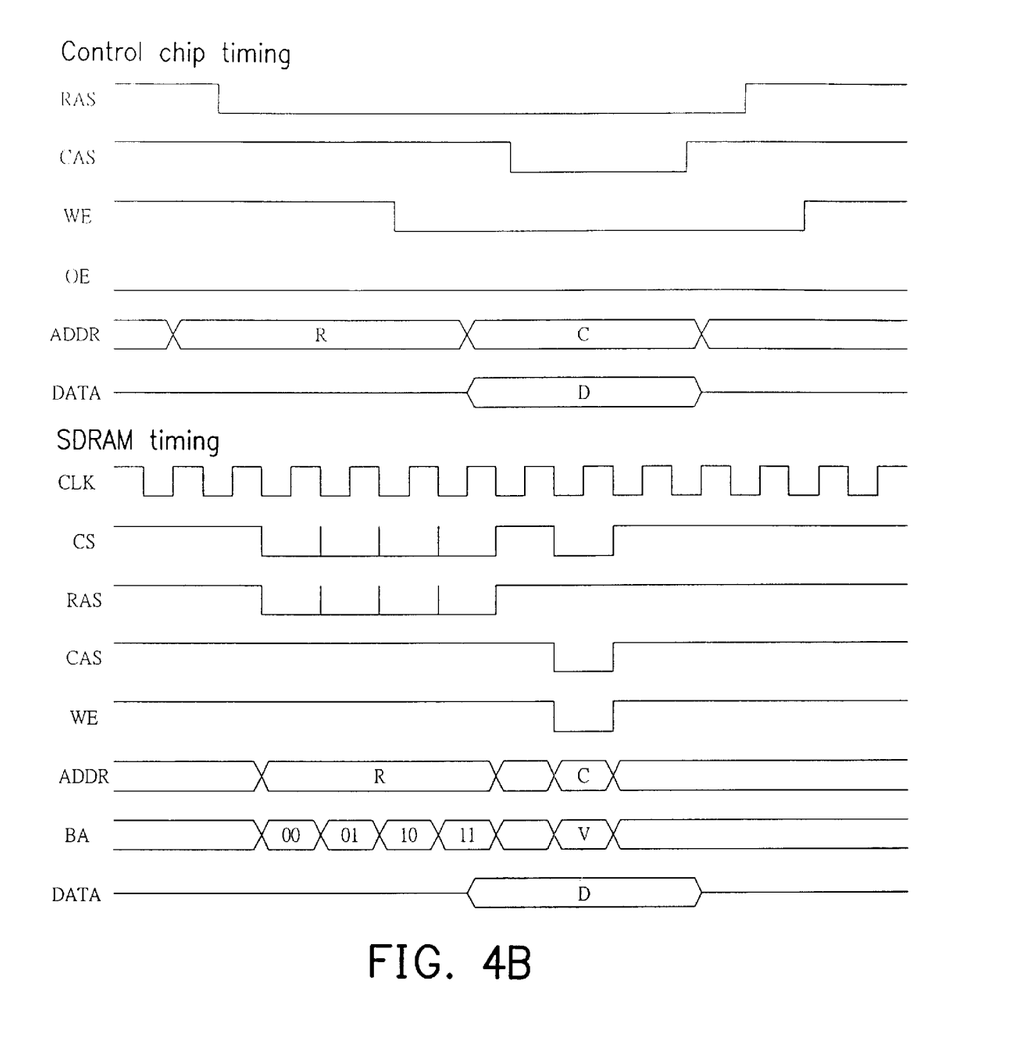
FIG. 4B is a timing diagram showing a write operation using a conversion mode according to a third preferred embodiment of this invention.

FIG. 4A is a timing diagram showing a reading operation using a conversion mode according to a third preferred embodiment of this invention. FIG. 4B is a timing diagram showing a write operation using a conversion mode according to a third preferred embodiment of this invention. In the third embodiment, the EDO DRAM has row addresses R0~R9 and column addresses C0~C9. The SDRAM has row addresses R0~R11, column addresses C0~C7 and bank addresses B0~B1. The column address number L of the SDRAM chip 120 is less than the column address number J of the EDO DRAM, the sum of the column address number L and the bank address number M is equal to the column address number J of the EDO DRAM and the row address number K exceeds the row address number I of the EDO DRAM by two. Hence, the third type of command conversion mode can be used to convert the first command control signal to the second command control signal. Furthermore, the SDRAM chip 120 is simulated as $2^2=4$ pages and the mode control selection value inside the mode control selection storage device is set so that the particular page within the SDRAM chip 120 to be operated upon is selected. As shown in FIGS. 4A and 4B, when the memory command converter 100 receives the row address R0~R9 signals from the control chip 110, the signals are directly transferred to the row addresses R0~R9 of the SDRAM $2^2=4$ times consecutively. Actual levels of the row addresses R10~R11 are determined by the mode control selection value so that the particular page within the SDRAM chip 120 to be operated upon is determined. In the meantime, bank address values including 00, 01, 10 and 11 are sequentially transmitted so that various banks within the SDRAM chip 120 are triggered. On receiving the column address C0~C9 signals from the EDO DRAM, the memory command converter 100 transfers the column addresses C0~C7 directly to the column addresses C0~C7 of the SDRAM chip 120 and the column addresses C8~C9 to the bank addresses B0~B1 of the SDRAM chip 120. This type of conversion operating mode has an operating efficiency higher than the second mode but lower than the first mode.

In conclusion, through the incorporation of a memory command converter into an application system, mode control selection value of the mode control selection storage device is set according to the type of SDRAM chip used. Using the mode control selection value, EDO DRAM control signals from a control chip can be easily converted into various SDRAM controlling signals. Hence, production cost of the application system is reduced while working life of the application system is extended.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An application system for memory command conversion, comprising:
   a control chip for outputting a first command control signal to control an extended data output dynamic random access memory (EDO DRAM);
   a synchronous dynamic random access memory (SDRAM) chip for holding application system data;
   a memory command converter coupled to the control chip and the SDRAM chip for receiving the first command control signal from the control chip and for converting the first command control signal into a second command control signal acceptable by the SDRAM chip; and
   a clocking generator coupled to the memory command converter for providing necessary clocking signals to the memory command converter.

2. The application system of claim 1, wherein the memory command converter further includes:
   a mode control selection storage device coupled to the control chip for receiving and holding a mode control selection value of the SDRAM chip;
   a command control circuit coupled to the mode control selection storage device, the control chip and the SDRAM chip, wherein the command control circuit sets the operating mode of the SDRAM chip and converts the first command control signal into the second command control signal according to the mode control selection value inside the mode control selection storage device; and
   a clocking control circuit coupled to the clocking generator, the command control circuit, the control chip and the SDRAM chip for receiving a clocking signal from the clocking generator, converting the signal and distributing the converted signal to the command control circuit, the control chip and the SDRAM chip as a synchronizing pulse.

3. The application system of claim 2, wherein the first command control signal includes: I lines of first row addresses and J lines of first column addresses, and the second command control signal includes: K lines of second row addresses, L lines of second column addresses and M lines of bank addresses.

4. The application system of claim 3, wherein if L>J, (K+M)−I=N and N is a whole number greater than zero, and when the command control circuit receives the I lines of first row addresses, the first row addresses are directly transferred to the I lines of second row addresses and the bank addresses, and according to the mode control selection value, actual levels of another N lines of second row addresses and bank addresses are determined so that the particular page among the $2^N$ simulated pages of the SDRAM chip to be operated on is selected, and on receiving the J lines of first column addresses, the column addresses are directly transferred to the J second column addresses, and the (L−J) lines of the second column addresses are set to a low level.

5. The application system of claim 3, wherein if (K+L+M)−(I+J)=N and N is a whole number greater than zero, when the command control circuit receives I lines of the first row addresses, the addresses are latched and retained, on receiving the J lines of first column addresses, the I lines of first row addresses and the J lines of first column addresses are re-assigned and transferred to the (I+J−L) lines of the second row addresses and the bank addresses, and according to the mode control selection value, actual levels of the N lines of the second row addresses and the bank addresses are determined so that the particular page among the $2^N$ simulated pages of the SDRAM chip to be operated upon is selected, and finally the L lines of the second column addresses are transferred and distributed.

6. The application system of claim 3, wherein if (L+M)=J and K−I=N and N is a whole number greater than zero, when the command control circuit receives the I lines of the first row addresses, the row addresses are directly transferred to the I lines of second row addresses consecutively in $2^M$ times, and according to the mode control selection value, actual levels of the N lines of second row addresses are determined so that the particular page among the $2^N$ pages of the SDRAM chip to be operated on is selected, meanwhile, $0\sim2^M-1$ bank address values are sequentially transmitted so that various banks within the SDRAM chip are triggered, and on receiving the J lines of the first column addresses, the J lines of column addresses are transferred to the L lines of second column addresses and the M lines of bank addresses.

7. A memory command converter for converting a first command control signal from a control chip for controlling an extended data output dynamic random access memory (EDO DRAM) into a second command control signal acceptable to a synchronous dynamic random access memory (SDRAM) chip, comprising:

- a mode control selection storage device coupled to the control chip for receiving and holding a mode control selection value of the SDRAM chip;
- a command control circuit coupled to the mode control selection storage unit, the control chip and the SDRAM chip for setting the operating mode of the SDRAM and converting the first command control signal into the second command control signal according to the mode control selection value within the mode control selection storage device; and
- a clocking control circuit coupled to an external clocking generator, the command control circuit, the control chip and the SDRAM chip for receiving a clocking signal from the clocking generator, converting the clocking signal and dispatching the converted signal to the command control circuit, the control chip and the SDRAM chip to serve as a synchronizing pulse.

8. The memory command converter of claim 7, wherein the first command control signal includes: I lines of first row addresses and J lines of first column addresses, and the second command control signal includes: K lines of second row addresses, L lines of second column addresses and M lines of bank addresses.

9. The memory command converter of claim 8, wherein if L>J, (K+M)−I=N and N is a whole number greater than zero, and when the command control circuit receives the I lines of first row addresses, the first row addresses are directly transferred to the I lines of second row addresses and the bank addresses, and according to the mode control selection value, actual levels of another N lines of second row addresses and bank addresses are determined so that the particular page among the $2^N$ simulated pages of the SDRAM chip to be operated on is selected, and on receiving the J lines of first column addresses, the column addresses are directly transferred to the J second column addresses, and the (L−J) lines of the second column addresses are set to a low level.

10. The memory command converter of claim 8, wherein if (K+L+M)−(I+J)=N and N is a whole number greater than zero, when the command control circuit receives I lines of the first row addresses, the addresses are latched and retained, on receiving the J lines of first column addresses, the I lines of first row addresses and the J lines of first column addresses are re-assigned and transferred to the (I+J−L) lines of the second row addresses and the bank addresses, and according to the mode control selection value, actual levels of the N lines of the second row addresses and the bank addresses are determined so that the particular page among the $2^N$ simulated pages of the SDRAM chip to be operated upon is selected, and finally the L lines of the second column addresses is transferred and distributed.

11. The memory command converter of claim 8, wherein if (L+M)=J and K−I=N and N is a whole number greater than zero, when the command control circuit receives the I lines of the first row addresses, the row addresses are directly transferred to the I lines of second row addresses consecutively in $2^M$ times, and according to the mode control selection value, actual levels of the N lines of second row addresses are determined so that the particular page among the $2^N$ pages of the SDRAM chip to be operated on is selected, meanwhile, $0\sim2^M-1$ bank address values are sequentially transmitted so that various banks within the SDRAM chip are triggered, and on receiving the J lines of the first column addresses, the J lines of column addresses are transferred to the L lines of second column addresses and the M lines of bank addresses.

* * * * *